US012637159B2

(12) United States Patent　　　(10) Patent No.:　　US 12,637,159 B2
Marukawa et al.　　　(45) Date of Patent:　　May 26, 2026

(54) APPLIQUE ATTACHMENT ON CASTING

(71) Applicant: Honda Motor Co., Ltd., Tokyo (JP)

(72) Inventors: Taiga Marukawa, Rochester Hills, MI (US); Gilberto Larrache-Irizarry, Delaware, OH (US); Douglas M. Dafler, Delaware, OH (US); Patrick J. Ellison, Plain City, OH (US); Kosaku Tomozawa, Wako (JP); Keiichiro Tsuji, Novi, MI (US); Takashi Nakano, Utsunomiya (JP); Anthony John Leanza, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 17/848,985

(22) Filed: Jun. 24, 2022

(65) Prior Publication Data

US 2023/0415833 A1　　Dec. 28, 2023

(51) Int. Cl.
　*B62D 63/04*　　(2006.01)
　*B60R 11/04*　　(2006.01)
　*B60R 13/04*　　(2006.01)
　*B62D 65/02*　　(2006.01)
　*G01S 13/931*　　(2020.01)
　*G01S 17/931*　　(2020.01)

(52) U.S. Cl.
　CPC ............. *B62D 63/04* (2013.01); *B62D 65/02* (2013.01); *B60R 11/04* (2013.01); *B60R 13/04* (2013.01); *G01S 13/931* (2013.01); *G01S 17/931* (2020.01)

(58) Field of Classification Search
　CPC ........ B60R 11/04; B60R 13/04; B60R 19/483
　See application file for complete search history.

(56) References Cited

U.S. PATENT DOCUMENTS

| | | | | |
|---|---|---|---|---|
| 6,416,113 B1* | 7/2002 | Page | ..................... | B60J 5/0402 |
| | | | | 49/502 |
| 6,834,906 B2* | 12/2004 | Vaitus | ..................... | B60R 13/04 |
| | | | | 296/106 |
| 7,502,048 B2 | 3/2009 | Okamoto et al. | | |
| 7,537,256 B2* | 5/2009 | Gates | ..................... | B60Q 1/56 |
| | | | | 296/1.07 |
| 8,919,846 B2 | 12/2014 | Maass | | |
| 8,998,282 B2 | 4/2015 | Gerndorf et al. | | |
| 9,114,765 B1* | 8/2015 | James | ..................... | B60R 13/04 |

(Continued)

FOREIGN PATENT DOCUMENTS

| | | |
|---|---|---|
| CN | 108608943 | 10/2018 |
| CN | 110857069 | 3/2020 |

(Continued)

OTHER PUBLICATIONS

DE-102019130918-A1 translation (Year: 2021).*

(Continued)

*Primary Examiner* — Michael W Hotchkiss
(74) *Attorney, Agent, or Firm* — Mark E. Duell; Rankin, Hill & Clark LLP

(57)　　ABSTRACT

An autonomous vehicle and related method include, at each corner of the vehicle, a module including a cast frame configured to mount on a corner component of the autonomous vehicle, and an applique connected directly to the cast frame, wherein the applique covers at least part of the cast frame and defines a portion of an outside surface of the autonomous vehicle.

10 Claims, 9 Drawing Sheets

(56) References Cited

U.S. PATENT DOCUMENTS

| | | | |
|---|---|---|---|
| 9,802,656 B1 | 10/2017 | Williams et al. | |
| 9,885,526 B2 | 2/2018 | Maranville et al. | |
| 10,118,571 B2 * | 11/2018 | Maliskey | B60J 10/265 |
| 10,302,744 B1 * | 5/2019 | Krishnan | B60R 11/04 |
| 10,432,827 B2 | 10/2019 | Hartranft et al. | |
| 10,480,221 B2 | 11/2019 | Cumbo | |
| 10,561,044 B2 | 2/2020 | Schmidt | |
| 10,599,260 B1 | 3/2020 | Salter et al. | |
| 10,752,185 B2 | 8/2020 | Ette et al. | |
| 10,773,273 B2 | 9/2020 | Mousavi Ehteshami et al. | |
| 10,967,876 B2 | 4/2021 | Asakura et al. | |
| 11,710,894 B1 * | 7/2023 | Espinal | H01Q 1/3275 |
| | | | 348/148 |
| 2009/0064467 A1 * | 3/2009 | Xueyong | F16B 5/123 |
| | | | 24/292 |
| 2009/0295181 A1 * | 12/2009 | Lawlor | B60R 11/04 |
| | | | 296/1.11 |
| 2010/0238006 A1 | 9/2010 | Grider et al. | |
| 2011/0035909 A1 * | 2/2011 | Moberg | B60J 5/0468 |
| | | | 296/1.08 |
| 2012/0110918 A1 * | 5/2012 | Love | B60R 13/04 |
| | | | 24/292 |
| 2012/0137628 A1 * | 6/2012 | Brandt | B60J 10/45 |
| | | | 52/716.5 |
| 2012/0310519 A1 * | 12/2012 | Lawlor | B60R 1/12 |
| | | | 248/205.3 |
| 2014/0284962 A1 * | 9/2014 | Mally | B60R 13/0243 |
| | | | 296/146.7 |
| 2016/0129854 A1 * | 5/2016 | Bachelder | B60R 13/0206 |
| | | | 24/292 |
| 2016/0264065 A1 * | 9/2016 | Takeda | B60R 11/04 |
| 2016/0306030 A1 * | 10/2016 | Hara | G01S 17/931 |
| 2017/0051775 A1 * | 2/2017 | Dickinson | B60R 13/00 |
| 2018/0031696 A1 * | 2/2018 | Lewis | G01S 13/867 |
| 2019/0003895 A1 * | 1/2019 | Krishnan | B60R 11/04 |
| 2019/0104244 A1 * | 4/2019 | Kobayashi | H04N 23/90 |
| 2019/0152433 A1 | 5/2019 | Cumbo | |
| 2019/0219689 A1 * | 7/2019 | Fujita | B60R 19/483 |
| 2019/0256009 A1 * | 8/2019 | Miwa | G01S 13/931 |
| 2019/0329737 A1 * | 10/2019 | Bretagnol | B60R 11/04 |
| 2020/0156594 A1 | 5/2020 | Zhao et al. | |
| 2020/0191620 A1 * | 6/2020 | Kasai | B60R 11/04 |
| 2020/0254930 A1 | 8/2020 | Schmalenberg et al. | |
| 2020/0331496 A1 * | 10/2020 | Cao | G01S 17/931 |
| 2020/0346590 A1 | 11/2020 | Shane et al. | |
| 2020/0361398 A1 * | 11/2020 | Nakajima | B60R 11/04 |
| 2021/0001794 A1 * | 1/2021 | Umeki | B60R 19/483 |
| 2021/0016703 A1 | 1/2021 | Shitara et al. | |
| 2021/0063093 A1 | 3/2021 | Tobiassen et al. | |
| 2021/0339710 A1 * | 11/2021 | Adams | G01S 15/931 |
| 2022/0410709 A1 * | 12/2022 | Florentz | B60K 37/10 |

FOREIGN PATENT DOCUMENTS

| | | | | |
|---|---|---|---|---|
| CN | 110893825 | 3/2020 | | |
| CN | 111071177 A * | 4/2020 | | B60J 10/70 |
| DE | 102012100497 B4 * | 8/2014 | | B60R 11/04 |
| DE | 102019130918 A1 * | 5/2021 | | |
| EP | 2163431 | 9/2010 | | |
| IN | 201711029126 | 6/2019 | | |
| KR | 19980040800 | 9/1998 | | |
| KR | 19980082751 | 12/1998 | | |
| KR | 100568985 | 4/2006 | | |

OTHER PUBLICATIONS

DE-102012100497-B4 translation (Year: 2014).*
CN-111071177-A machine translation (Year: 2020).*
Notice of Allowance of U.S. Appl. No. 17/849,119 dated Aug. 21, 2024, 26 pages.

* cited by examiner

APPLIQUE ATTACHMENT ON CASTING

BACKGROUND

Vehicles include a variety of sensors for sensing an external environment around the vehicle. Some of these sensors are used to help operate the vehicle. In vehicles where the operator is driving, information from these sensors may cause a warning to be given to the operator, or may cause a control system to temporarily regulator of one or more controls of the vehicle to modify its operation (e.g. lane assist or forward collision avoidance). In vehicles that have an autonomous control function, information from these sensors may be used by a control system to navigate the vehicle.

BRIEF DESCRIPTION

According to one aspect, an autonomous vehicle module includes a cast frame configured to mount on a corner of an autonomous vehicle; and an applique connected directly to the cast frame such that the applique covers at least part of the cast frame and defines a portion of an outside surface of the autonomous vehicle.

According to another aspect, an autonomous vehicle includes at each corner, a module comprising a cast frame mounted on a corner component of the autonomous vehicle; and an applique connected directly to the cast frame such that the applique covers at least part of the cast frame and defines a portion of an outside surface of the autonomous vehicle.

According to another aspect, a method of making an autonomous vehicle includes providing a module including a cast frame, and an applique connected directly to the cast frame such that the applique covers at least a part of the cast frame. The method includes mounting the module at a corner of the autonomous vehicle by connecting the cast frame to a corner component of the autonomous vehicle such that the applique defines a portion of an outside surface of the autonomous vehicle.

According to another aspect, an autonomous vehicle module includes a cast frame configured to mount on a corner of an autonomous vehicle; and a plurality of sensors mounted on the cast frame, the plurality of sensors being configured to sense an environment around the autonomous vehicle and to communicate data about the environment to a navigation system of the autonomous vehicle for navigating the autonomous vehicle.

According to another aspect, an autonomous vehicle includes, at each corner, a sensor module. The sensor module includes a cast frame mounted on a corner component of the autonomous vehicle; and a plurality of sensors mounted on the cast frame, the plurality of sensors sensing an environment around the autonomous vehicle and communicating data about the environment to a navigation system of the autonomous vehicle. The navigation system navigates the autonomous vehicle based on the data.

According to another aspect, a method of operating an autonomous vehicle includes providing, at each corner the autonomous vehicle, a sensor module including a cast frame mounted on a corner component of the autonomous vehicle, and a plurality of sensors mounted on an inboard side and an outboard side of the cast frame, the plurality of sensors including a lidar, a near field sensor, a radar, a camera, and a SPAM; sensing, with the plurality of sensors, an environment around the autonomous vehicle while the autonomous vehicle is operating; communicating data about the environment from the plurality of sensors to a navigation system of the autonomous vehicle; and navigating the autonomous vehicle based on the data.

DETAILED DESCRIPTION

Figure 8:
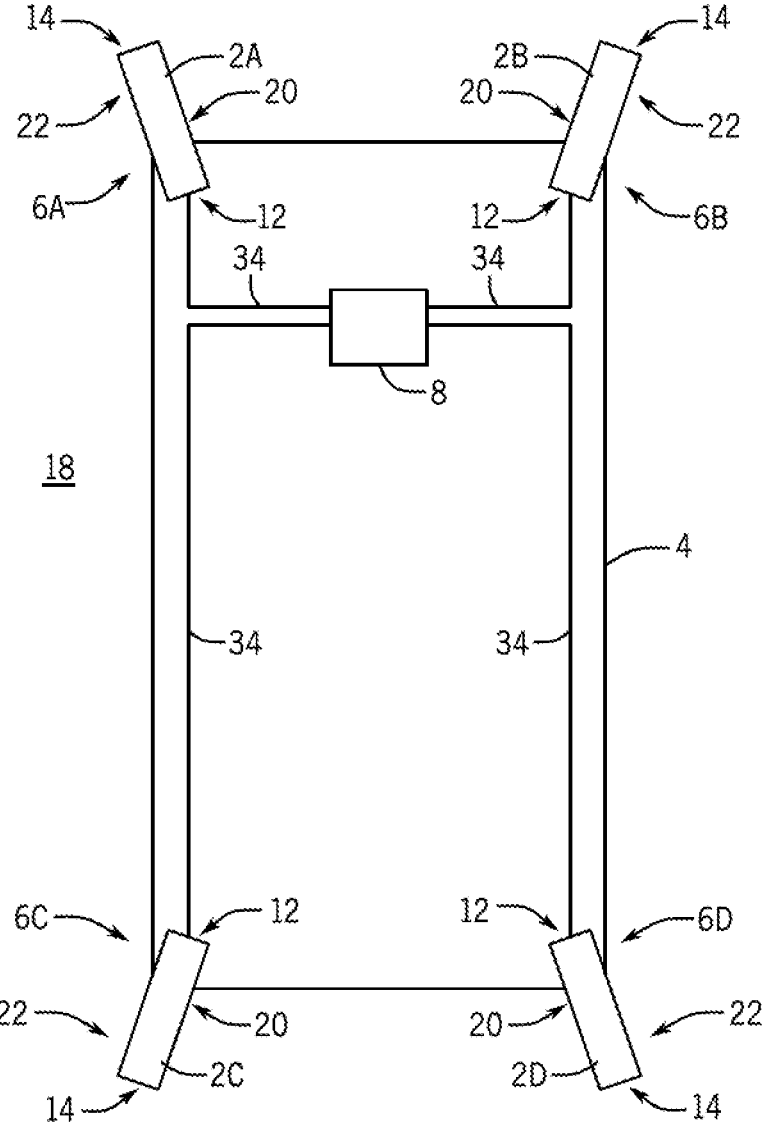
FIG. 8 is a top schematic view of a vehicle including four sensor modules according to the present subject matter.

Referring to the figures, a sensor module 2 is provided for mounting to a vehicle 4. The sensor module 2 may be mounted to any part of the vehicle 4, and optionally to one or more corners 6 of the vehicle 4. As seen in FIG. 8, the vehicle 4 includes a plurality (i.e., four) of sensor modules 2 respectively attached to each of the corners 6 (e.g. forward right corner 6A, forward left corner 6B, rearward right corner 6C, rearward left corner 6D) of the vehicle 4. More or less sensor modules 2 can be mounted on the vehicle 4 and at different locations than at a corner 6.

The vehicle 4 may be a one that is under complete driver control, or an autonomous vehicle with one or more functions of the vehicle 4 being autonomously controlled by a controller/navigation system 8 of the vehicle 4. If the vehicle 4 is an autonomous vehicle, a level of control exerted by the controller/navigation system 8 on the autonomous vehicle 4 may range from level 1 to level 5 as defined by the Society of Automotive Engineers (SAE). The vehicle 4 may be a fully autonomous vehicle (i.e. level 5). The vehicle 4 may be an autonomous motor vehicle having a function of movement along a roadway.

The vehicle 4 may include one or more sensor modules 2. In one non-limiting example, the vehicle 4 includes four sensor modules 2, with each of four corners 6 of the vehicle 4 having a respective sensor module 2 mounted thereto. If more than one sensor module 2 is used, the plurality of sensor modules 2 may be identical to, or different from, one or more of the other sensor modules 2. In one non-limiting example, two front sensor modules, i.e. a front left sensor module 2A and a front right sensor module 2B are arranged on respective right and left forward corners 6A, 6B of the vehicle 4, and two rear sensor modules, i.e. a rear left sensor module 2C and a rear right sensor module 2D are arranged on respective right and left rearward corners 6C, 6D of the vehicle 4. The two front sensor modules 2A, 2B may be identical to each other except for being mirror arrangements of each other. The two rear sensor modules 2C, 2D may be identical to each other except for being mirror arrangements of each other, but may be different from the two front sensor modules 2A, 2B.

Figure 9:
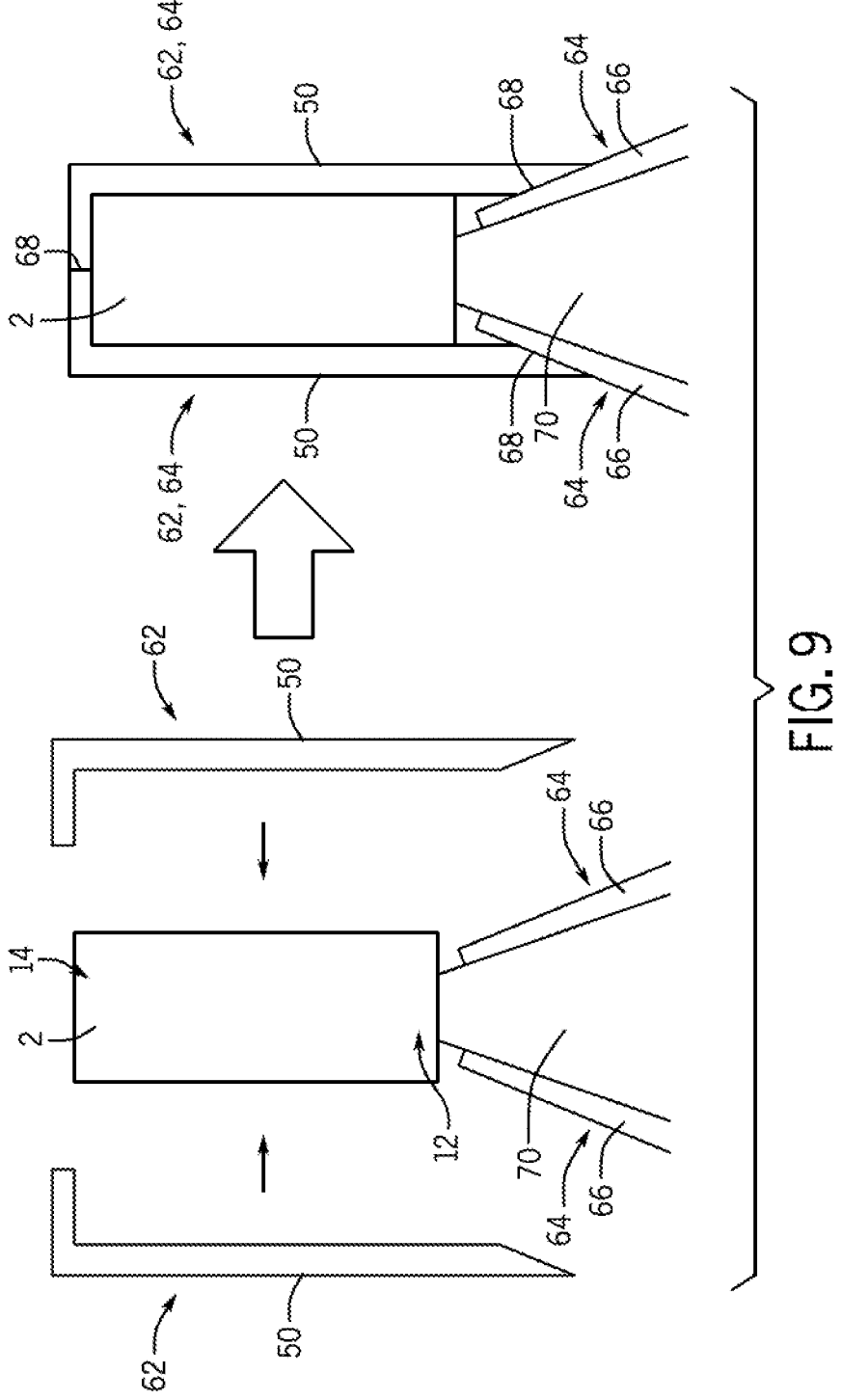
FIG. 9 is a top schematic view of a sensor module and appliques being attached to a vehicle corner component.

Each sensor module 2 includes a frame 10, by which the sensor module 2 is mounted to the one or more corners 6 of the vehicle 4. The frame 10 may be mounted onto the corner 6 of the vehicle 4 with fasteners (e.g. bolts), by welding, by adhesive, etc. The frame 10 may be attached to a corner component 70 of the vehicle 4, e.g. a vehicle frame member or body panel located at the corner 6 of the vehicle 4. The frame 10 may be an elongated body, which is attached to the vehicle 4 only at its proximal end 12, longitudinally extending out like an arm away from the vehicle 4, and terminating at an opposite distal end 14 (FIG. 9).

The frame 10 may be made of any material including but not limited to metal, polymer, wood, ceramic, glass, carbon, and composites and combinations thereof. The frame 10 may include one or more pieces made by any process including but not limited to casting, machining, molding, extrusion, stamping, rolling, additive manufacturing (e.g. 3D printing), cutting, or combinations thereof. The frame 10 may include metal and may be formed by high pressure die casting, and thus may be a high pressure die cast frame 10. The high pressure die casting may be performed at 1000 bar or more. The frame 10 may be solid or hollow.

When mounted to the vehicle 4, the elongate frame 10 may extend/project away from the vehicle 4 in a generally forward or backward direction as depicted in FIG. 8. When mounted to the vehicle 4, the frame 10 has an inboard side 20 and an outboard side 22. The sensor module 2 includes one or more sensors 16 mounted on the frame 10. The sensors 16 may be mounted to the inboard side 20 and to the outboard side 22 of the frame 10. The sensors 16 are mounted to the frame 10, and may be mounted directly to the frame 10, and thus the sensors 16 are only indirectly mounted to the remainder of the vehicle 4 via the frame 10. The sensors 16 may be provided power for their operation from the vehicle 4, e.g. via a common electrical connection harness on the sensor module 2 that connects all the sensors 16 and all the other electronic components of the sensor module 2 to an electrical power source of the vehicle 4 via a wired power connection, so as to provide power from the electrical power source to the sensors 16 and other electronic components. The harness may also make a wired communication connection with the navigation system 8 for communicating the sensed data about the environment 18 from the plurality of sensors 16 to the navigation system 8.

The sensors 16 are not particularly limited, and can include any kind of sensor as desired. The sensors 16 may be configured to sense various measurable characteristics of an external environment 18 around the vehicle 4. The sensors 16 may operate to sense the environment 18 when the vehicle 4 is being operated, such as when it is being driven on a roadway, and/or when the vehicle 4 is not being operated, such as when it is parked.

The sensors 16 may include a lidar 24, a radar 26, a camera 28, a near-field sensor 30, a SPAM 32, a microphone (not shown), other sensors for sensing the environment 18, multiples thereof, or combinations thereof.

The sensors 16 may be configured to sense the environment 18 and communicate sensed data about the environment 18 to the controller/navigation system 8 of the vehicle 4. This sensed data may be used by the controller 8 in a vehicle with complete driver control for issuing a warning to the driver, or this sensed data may be used by the navigation system 8 in an autonomous vehicle 4 for the navigating the autonomous vehicle 4 or controlling one or more functions (e.g. movement along a roadway) of the vehicle 4. The sensors 16 may be in communication with the controller/navigation system 8 through one or more wired or wireless communication connections 34, which are schematically depicted in FIG. 8.

In a non-limiting example, the sensor module 2 includes a spinning lidar 24, which may be mounted to a top of the frame 10. The lidar 24 may include a plate 44 one which nozzles 46 are mounted, the nozzles 46 being configured to spray a cleaning fluid on an exterior of the lidar 24 to keep the exterior of the lidar 24 clean, which may affect proper functioning of the lidar 24. The lidar 24 may be configured to determining ranges (variable distance) by targeting an object or a surface in the environment 18 with a laser and measuring the time for the reflected light to return to a receiver of the lidar 24. It can also be used to make digital 3-D representations of the environment 18.

The sensor module 2 module may include two high resolution radars 26 (e.g. 4D imaging radar), which may be respectively mounted on the inboard side 20 and the outboard side 22 of the frame 10. The high-resolution radars 26 may be used to provide detailed image data of the environment in a wide field of view, detect obstacles on the side of a road, detect smaller targets, such as a person or a bike, even if they are somewhat masked by a large object, such as a tree or truck, determine whether detected objects are moving, in which direction, and provide real-time situational data.

The sensor module 2 module may include two surround cameras 28A, and two medium resolution cameras 28B with baffles. The two surround cameras 28A may be respectively mounted on the inboard side 20 and the outboard side 22 of the frame 10, and may provide data used to produce a surround image of the vehicle 4. The two medium resolution cameras 28B may be respectively mounted on the inboard side 20 and the outboard side 22 of the frame 10, and may provide data used for object classification, scene understanding or tasks that rely on color perception like traffic light or sign recognition.

The sensor module 2 module may include two near-field sensors 30, which may be respectively mounted on the inboard side 20 and outboard side 22 of the frame 10. The sensor module 2 may include SPAM 32.

The sensor module 2 module may include a microphone (not shown) mounted on the frame 10 for sensing sound data from the environment 18, such as from sirens of an emergency vehicle.

The sensor module 2 module may include other electronic or non-electronic components, which are not particularly limited and can be mounted on the frame 10. The various other electronic or non-electronic components can be connected to a vehicle power source of the vehicle 4. These other electronic or non-electronic components may include, but are not limited to, an ethernet switch 36, a fan 38, a display 40, a manifold 42, multiples thereof, or combinations thereof.

The ethernet switch 36 may be in communication with each of the sensors 16 via a wired or wireless communication connection, such that data from the sensors 16 (i.e. sensed data) about the environment 18 may be transmitted from the sensors 16 to the ethernet switch 36. The ethernet switch 36 may then transmit the data about the environment to the controller/navigation system 8 via the wired or wireless communication connection 34, and the controller/navigation system 8 may use the data about the environment to control one or more functions of the vehicle 4 (e.g.

movement along a roadway). The ethernet switch 36 may be mounted on the inboard side 20 of the frame 10 near the proximal end 12, and in communication with the various sensors 16 via a communication connection.

Two fans 38 may be mounted on the frame 10 for circulating a cooling gas (e.g. air) around the sensor module 2 to cool the other various components mounted the frame 10. The two fans 38 may be respectively mounted on the inboard side 20 and the outboard side 22 of the frame 10. One of the two fans 38 may push air towards the other various components and the other pull air away from the other various components mounted on the frame 10.

An XMI display 40 may be mounted on the outboard side 22 of the frame 10, e.g. opposite from the ethernet switch 36. The XMI display 40 may be used to display an image, e.g. numbers, letters, pictures, etc. The image is displayed so as to be seen from the environment 18, e.g. the outboard side of the vehicle 4. The image is not particularly limited, and may convey various information, including for example, information that is associated with the vehicle 4 or with a particular intended passenger of the vehicle 4 so that the intended passenger can identify the vehicle 4 from among other vehicles.

The manifold 42 may be mounted to a bottom of the frame 10, and may be configured to direct and disperse the cleaning fluid to the various nozzles 46 of the lidar 24 via respective fluid lines 48 connected between them. The manifold 42 may be supplied with cleaning fluid via a fluid connection with a cleaning fluid source of the vehicle 4.

The sensor module 2 may include one or more appliques 50 (FIG. 9), each or which may be connected directly to the frame 10. When attached to the frame 10, the one or more appliques 50 may cover at least part of a sensor 16 and/or at least part of the cast frame 10, and may define a portion of an outside surface 62 of the sensor module 2. When the sensor module 2 is connected to the vehicle 4, the one or more appliques 50 may also define a portion of an outside surface 64 of the vehicle 4. In this way, the one or more appliques 50 may each act as exterior body panel 66 of the sensor module 2 and of the vehicle 4.

When the sensor module 2 includes a plurality of appliques 50, the plurality of appliques 50 may connect or overlap with each other so as to form a continuous or semi-continuous outer covering of the sensor module 2. The covering or appliques may separate, cover, hide, and/or protect underlying components of the sensor module 2 (e.g. the frame 10 and/or sensors 16) from the exterior environment 18, including covered portions of the frame 10 and covered portions of the sensors 16. The one or more appliques 50 may inhibit water, sunlight, or other environmental factors from contacting, reaching, or effecting the components of the sensor module 2 underlying the one or more appliques 50. The one or more appliques 50 may not cover all of the frame 10 or sensors 16, or may not cover an entire individual sensor 16. For example, a portion of the frame 10 may be exposed, e.g. before the module 2 is mounted on a corner 6 of the vehicle 4. Moreover, the lidar 24 may be exposed above, rather than be underneath, the covering formed by the one or more appliques or the covering formed by the one or more appliques 50 may include or define an opening through which a sensor 16 (e.g. the camera 28) can sense the environment 18. The covering may be formed by two or more appliques 50, where one is attached to the inboard side 20 and another is attached to the outboard side 22 of the frame and the two are connected together to form a seal 68 between them, and optionally between them and exterior body panel 66 of the vehicle 4, that inhibits environmental factors from reaching the underlying components of the sensor module 2.

Figure 1:
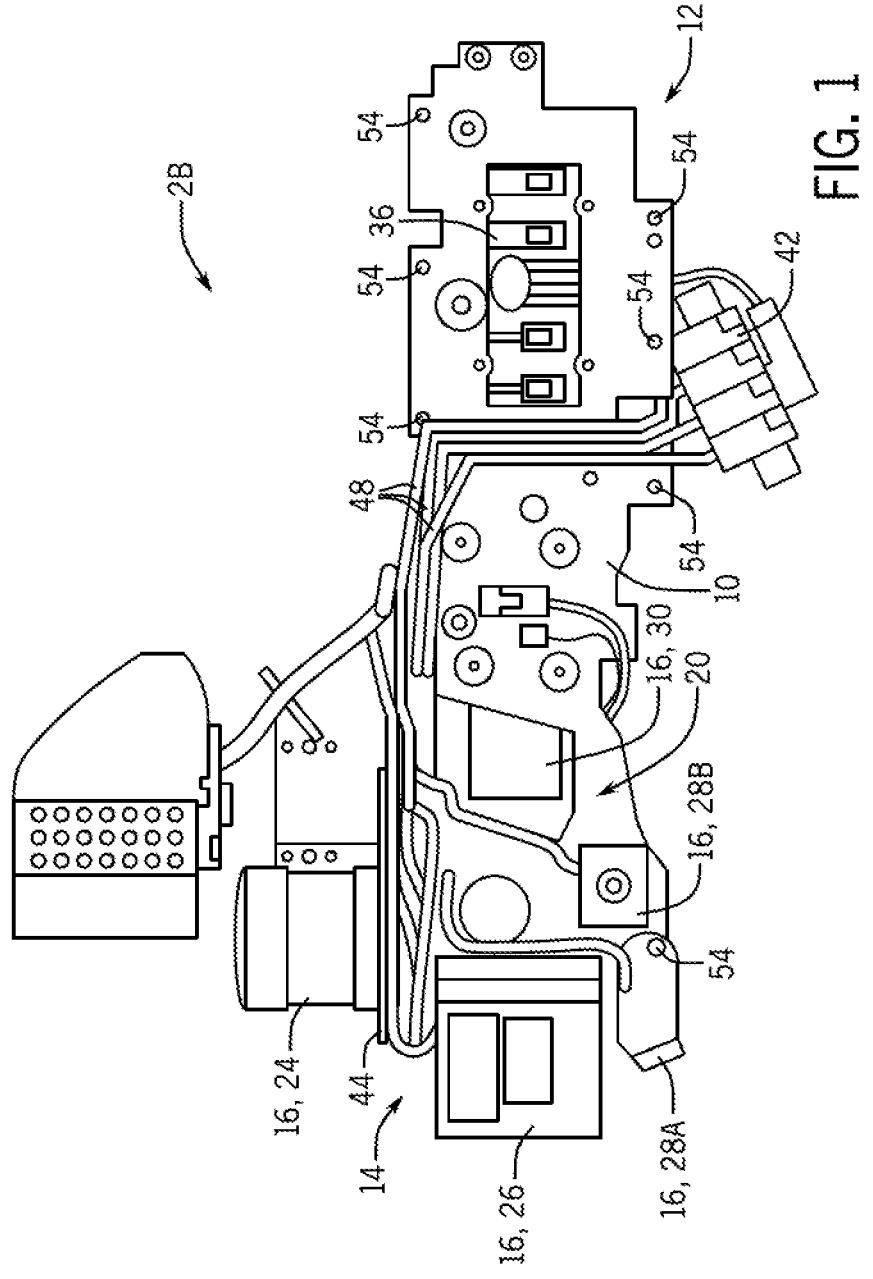
FIG. 1 is an inboard side elevation view of a front right sensor module according to the present subject matter.
Figure 2:
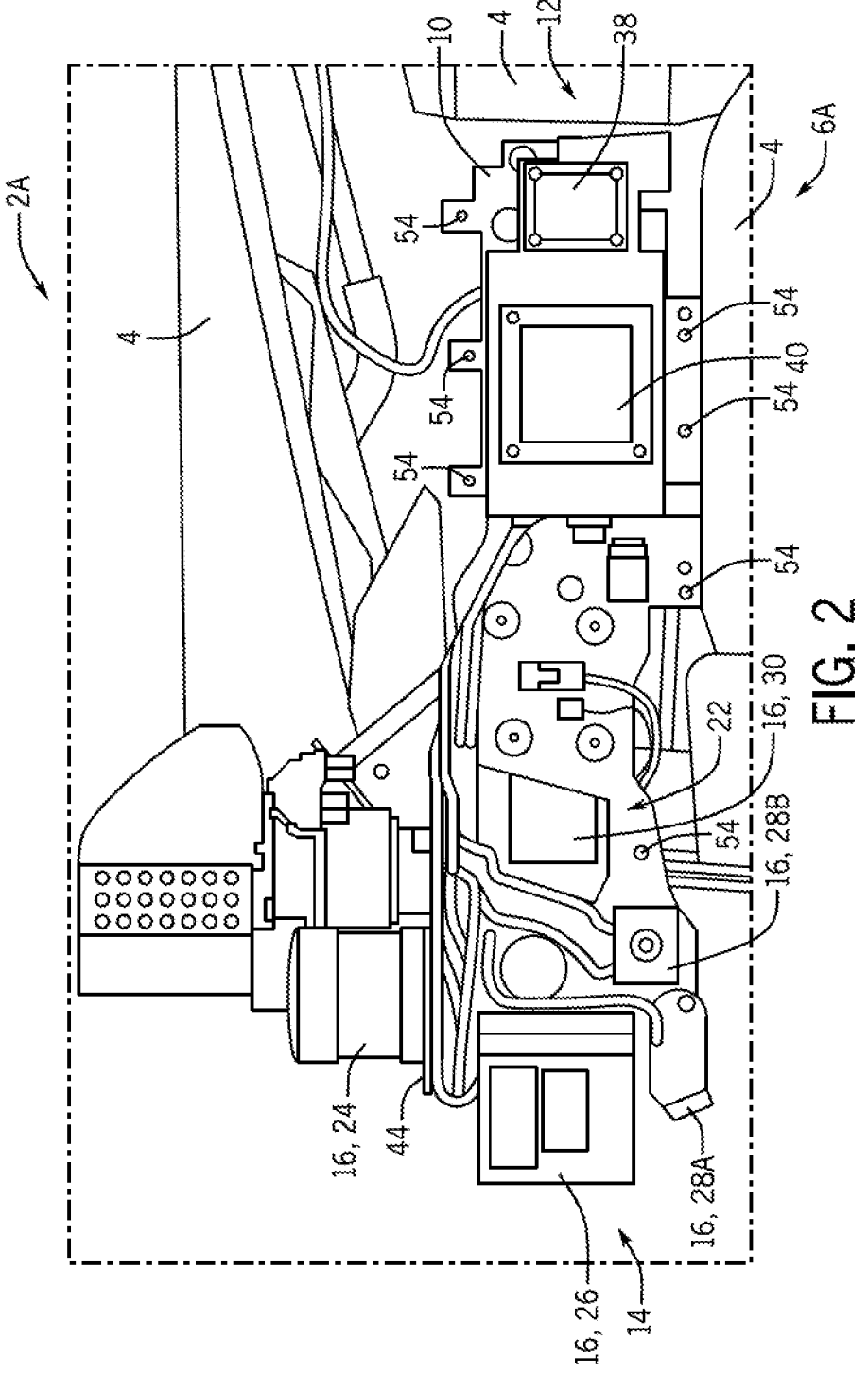
FIG. 2 is an outboard side elevation view of a front left sensor module mounted to an autonomous vehicle according to the present subject matter.
Figure 3:
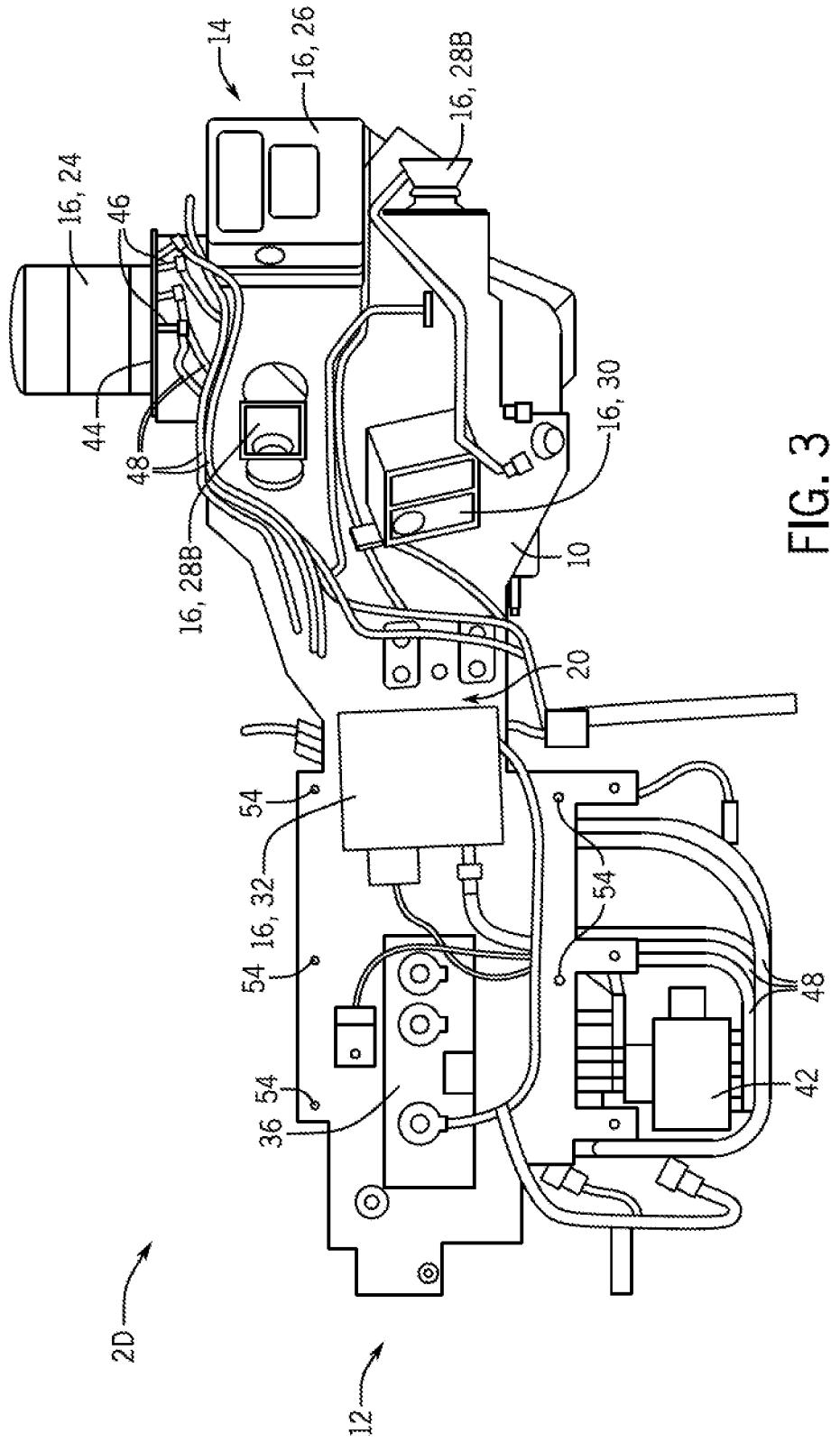
FIG. 3 is an inboard side elevation view of a rear right sensor module according to the present subject matter.
Figure 4:
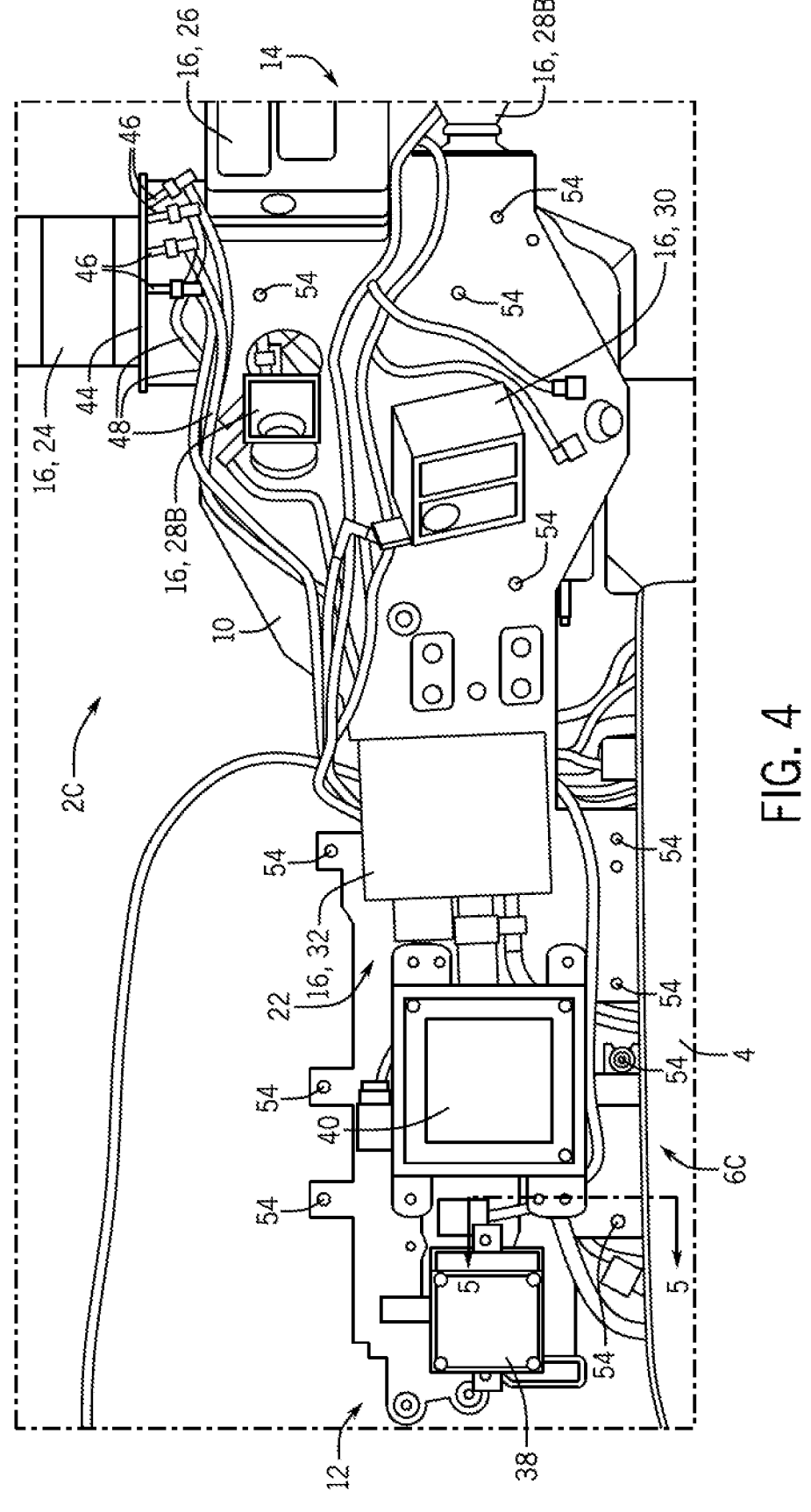
FIG. 4 is an outboard side elevation view of a rear left sensor module mounted to an autonomous vehicle according to the present subject matter.
Figure 5:
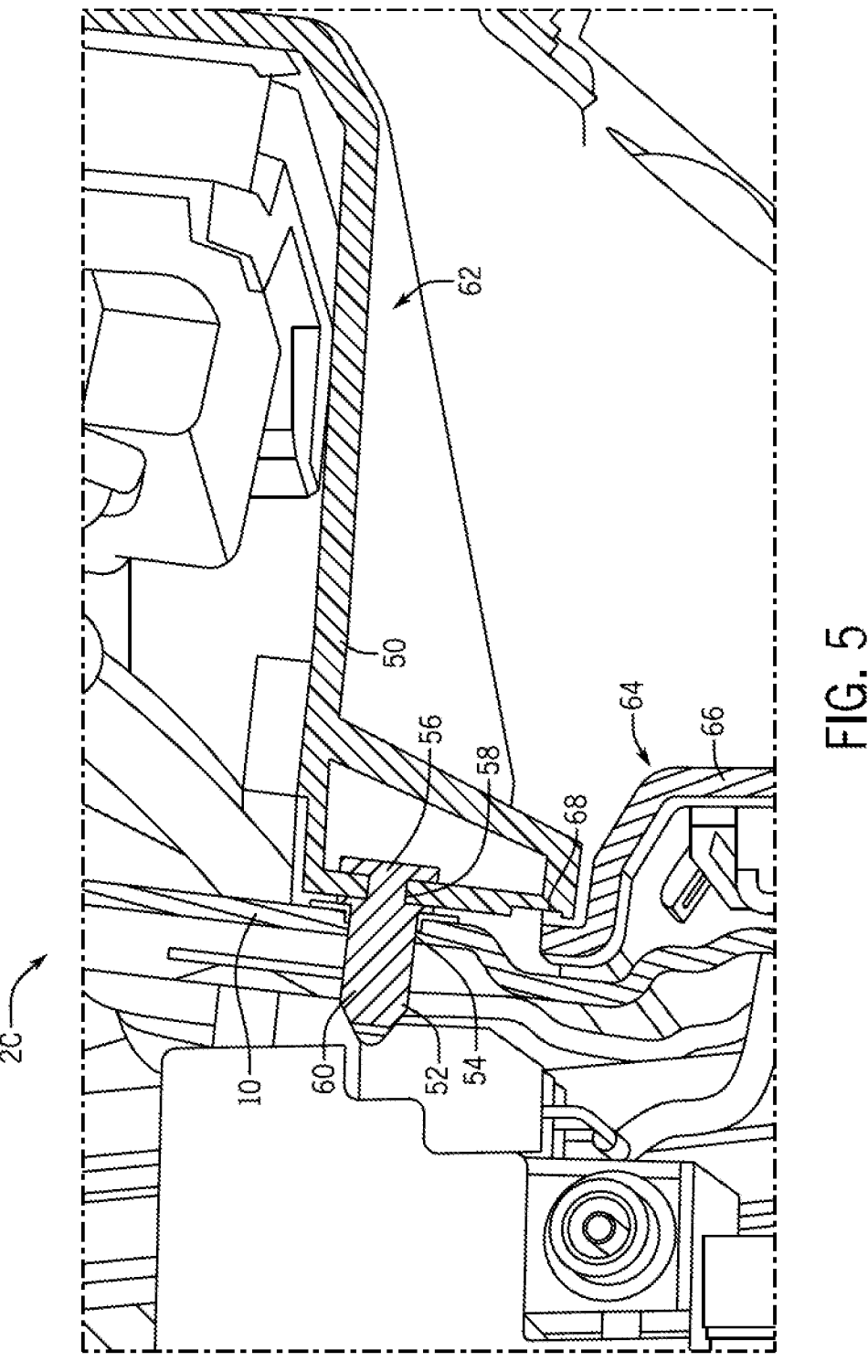
FIG. 5 is a cross-section view of the rear left sensor module of FIG. 4 taken along line 5-5.
Figure 6:
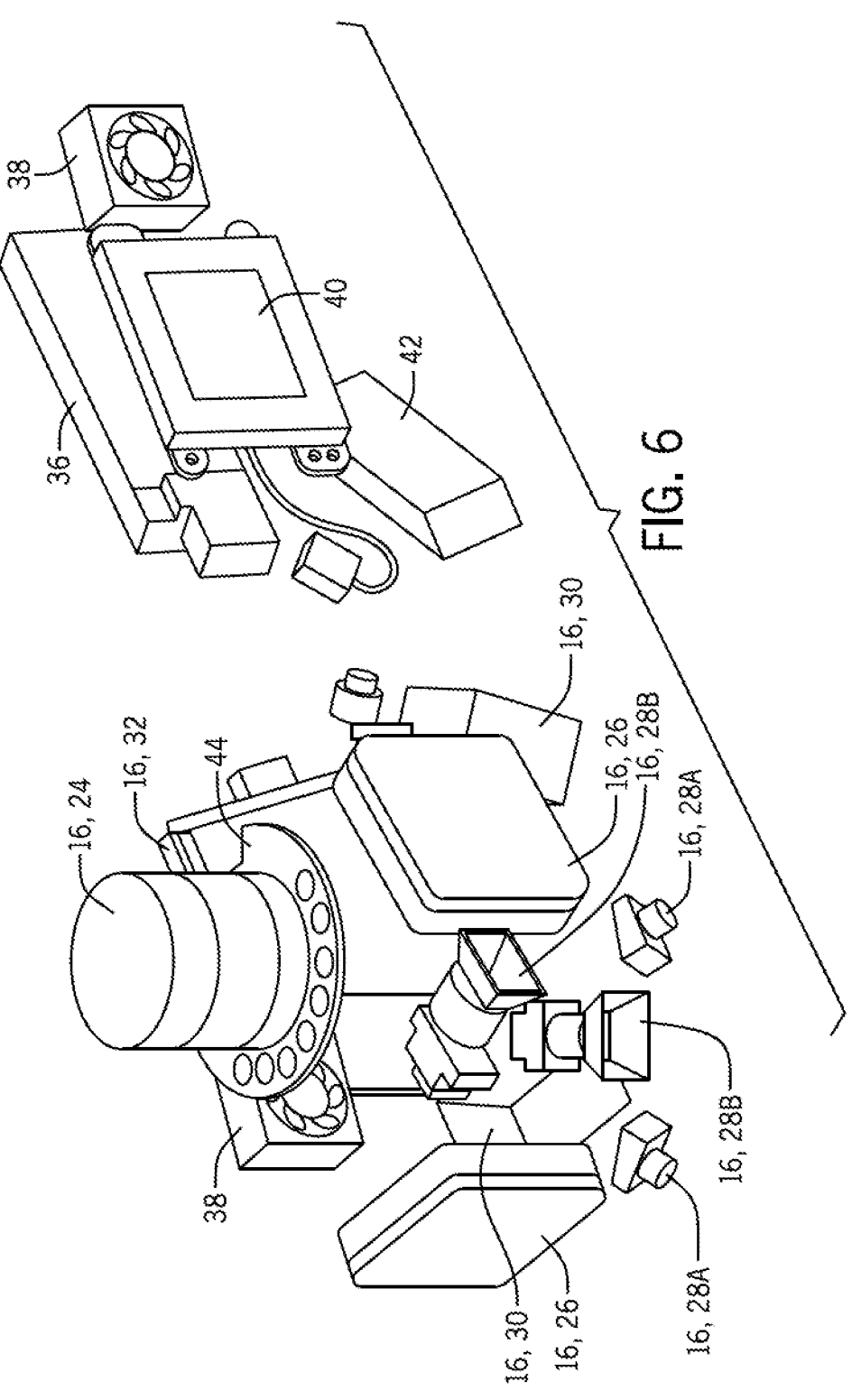
FIG. 6 is an upper rear right perspective view of a plurality of sensors as arranged on the rear right sensor module of FIG. 3 without showing the frame.
Figure 7:
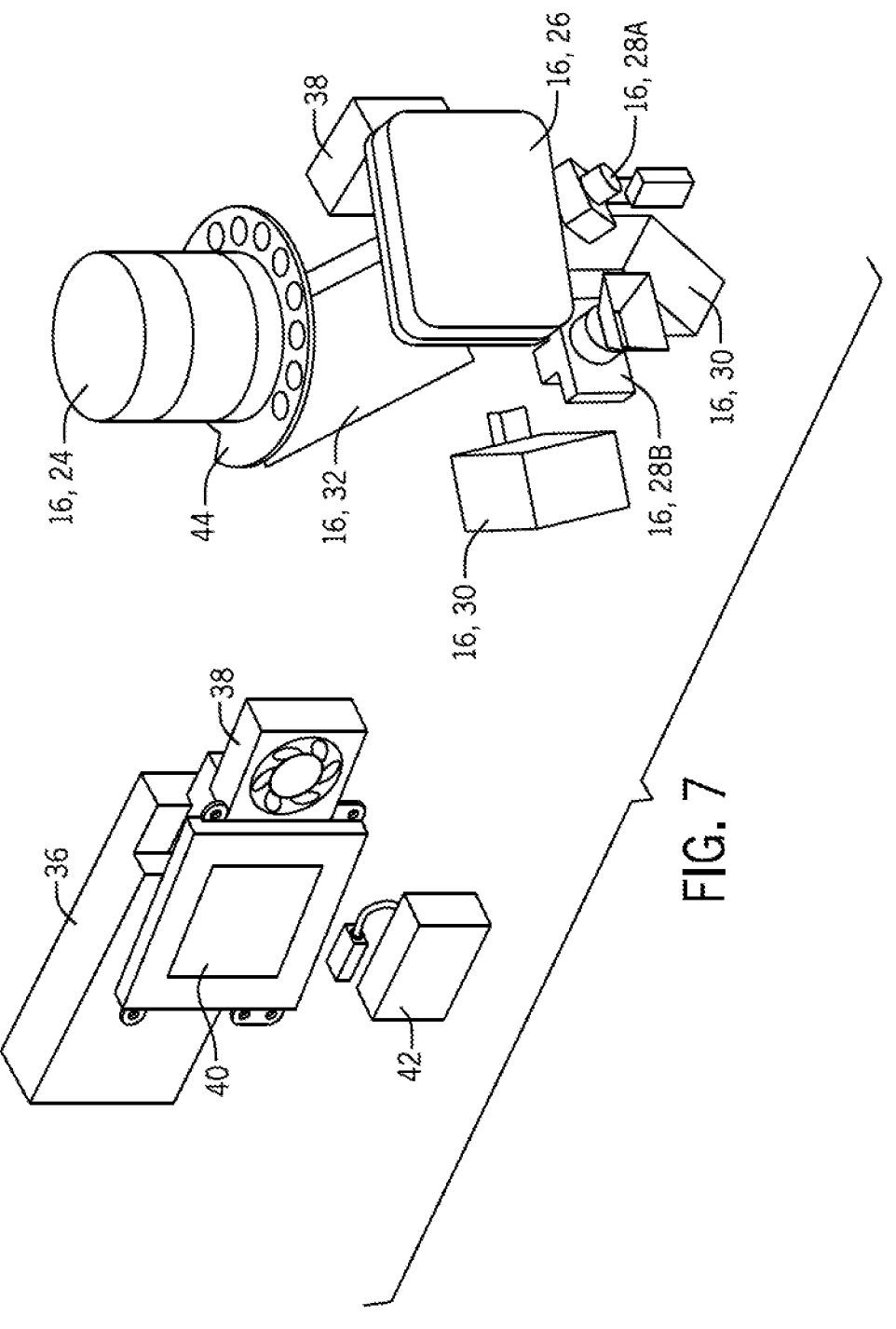
FIG. 7 is an upper rear left perspective view of a plurality of sensors as arranged on the rear left sensor module of FIG. 3 without showing the frame.

The frame 10 may include one or more openings 54 with which the one or more respective fasteners 52 are attached. The opening 54 may be a through hole or a blind hold, which may be cast, machined, or otherwise formed into the frame. The fastener 52 may be permanently or removably connected to the frame 10 by engaging with the opening 54, and may engage with the opening 54 by being inserted into the opening 54. The fastener 52 may removably connect with the opening 54 by snapping or clipping into the opening 54. The fastener 52 may be part of a one-piece constructions with the applique 50, or the fastener 52 may be separate and distinct from the applique 50 and be connected to the applique 50. As seen in FIG. 5, the fastener 52 is separate and distinct from the applique 50. The fastener 52 includes a head portion 56 that is inserted through a through hole 58 in the applique 50 and includes a shaft portion 60 that is inserted into the opening 54 in the frame 10 to thereby directly connect the applique 50 to the frame 10. In FIG. 5, the applique 50 is in contact with the frame 10, however, this is not required and the applique 50 may be spaced from the frame 10, e.g. by a spacer.

The applique 50 is directly connected to the frame 10, which direct connection may be accomplished in different ways than by using the fastener 52 engaging the opening 54, such as for example, by using adhesive, welding, friction fit, clips, snaps, bindings, etc.

The applique 50 may be made of any material including but not limited to metal, polymer, wood, ceramic, glass, carbon, and composites and combinations thereof. The applique 50 may include one or more pieces made by any process including but not limited to casting, machining, molding, extrusion, stamping, rolling, additive manufacturing (e.g. 3D printing), cutting, or combinations thereof. The applique 50 may include a polymer and may be formed by injection molding.

When attached to the frame 10, the one or more appliques 50 may cover at least a part of the frame 10 and/or part of the one or more sensors 16, and may cover the entirety of frame 10 and the one or more sensors 16. Alternatively, the one or more appliques 50 may cover only a part of the frame 10 and/or the one or more sensors 16. The covered part of the frame 10 and/or the sensor 16 may therefore be separated from the environment 18 by the applique 50. When attached to the frame 10, the one or more appliques 50 close out an exterior of the vehicle 4. In other words, the one or more appliques 50 form at least a portion of an exterior surface of the module 2 and form at least a portion of an exterior surface of the vehicle 4. In this way, the one or more appliques 50 may inhibit environmental factors, such as moisture, dirt, and radiation, from reaching the one or more sensors 16 and/or the frame 10 and thus may inhibit their degradation. If a fan 38 is included, the fan may operate to circulate air underneath the applique(s) 50 and around the other components attached to the frame 10 and around the frame 10 itself for cooling of the sensors 16 or drying of the frame 10.

A method of making an autonomous vehicle 4 includes providing a plurality of modules 2, each including the cast frame 10 and an applique 50 connected directly to the cast frame 10 such that the applique 50 covers at least a part of the cast frame 10. The method includes mounting one of the plurality of modules 2 at each corner 6 of the autonomous vehicle 4 by connecting the cast frame 10 to a corner component of the autonomous vehicle 4 such that the applique 50 defines a portion of an outside surface of the autonomous vehicle 4.

A method of operating an autonomous vehicle 4 may include providing, at each corner of the autonomous vehicle, a sensor module 2 including the cast frame mounted on a corner component 70 of the autonomous vehicle 4, and a plurality of sensors 16 mounted on an inboard side 20 and an outboard side 22 of the cast frame 10. The plurality of sensors includes a lidar 24, a near field sensor 30, a radar 26, a camera 28, and a SPAM 32. The method includes sensing, with the plurality of sensors 16, an environment 18 around the autonomous vehicle 4 while the autonomous vehicle 4 is operating (e.g. traveling along a roadway); communicating sensed data about the environment 18 from the plurality of sensors 16 to the navigation system 8 of the autonomous vehicle 4; and navigating the autonomous vehicle 4 based on the sensed data using the navigation system 8.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous vehicle module comprising:
a cast frame configured to mount on a corner of an autonomous vehicle, when mounted to the autonomous vehicle the frame has an inboard side and an outboard side opposite the inboard side relative to a width direction of the autonomous vehicle, and the frame has a proximal end for attachment to the autonomous vehicle and a distal end opposite the proximal end; and
an applique connected directly to the cast frame, wherein the applique covers at least part of the cast frame and defines a portion of an outside surface of the autonomous vehicle,
wherein the module includes a sensor and the cast frame includes a sensor mounting portion configured to support the sensor for the autonomous vehicle, and
wherein the applique includes a sensor opening to allow the sensor to detect through the sensor opening,
wherein the applique is one of at least two appliques connected directly to the cast frame, the at least two appliques extended from the proximal end to the distal end of the frame, the applique connected to and covering the outboard side of the frame, and another applique connected to and covering the inboard side of the frame,
wherein the at least two appliques are connected together to form a seal therebetween that inhibits environmental factors from reaching the cast frame,
wherein the cast frame includes an opening, and one of the at least two appliques includes an exterior wall and an interior wall offset from the exterior wall, the exterior wall and the interior wall together at least partially defining an enclosure between the exterior wall and the interior wall,
wherein the module includes a fastener secured by the interior wall, at least a part of the fastener received in the enclosure, the fastener connecting the one applique to the proximal end of the cast frame by being inserted into the opening.

2. The autonomous vehicle module according to claim 1, wherein the fastener clips into the opening.

3. The autonomous vehicle module according to claim 1, wherein:
the at least two appliques contact the cast frame;
the at least two appliques are each an injection molded part; and
the at least two appliques separate a covered part of the cast frame from an environment surrounding the module.

4. An autonomous vehicle system comprising:
a plurality of autonomous vehicle modules according to claim 1, each module mounted on a different corner of an autonomous vehicle; and
a central control unit configured to receive and process data from sensors mounted in each of the plurality of autonomous vehicle modules.

5. The autonomous vehicle module of claim 1, wherein:
the cast frame is made of a metal alloy having strength and heat dissipation properties; and
the least two of appliques are made of a polymer material.

6. An autonomous vehicle including at each corner, a module comprising:
a cast frame mounted on a corner component of the autonomous vehicle, the frame having an inboard side and an outboard side opposite the inboard side relative to a width direction of the autonomous vehicle, and the frame has a proximal end attached to the autonomous vehicle and a distal end opposite the proximal end; and
an applique connected directly to the cast frame, wherein the applique covers at least part of the cast frame and defines a portion of an outside surface of the autonomous vehicle,
wherein the module includes a sensor and the cast frame includes a sensor mounting portion configured to support the sensor for the autonomous vehicle, and
wherein the applique includes a sensor opening to allow the sensor to detect through the sensor opening,
wherein the applique is one of at least two appliques connected directly to the cast frame, the at least two appliques extended from the proximal end to the distal end of the frame, the applique connected to and covering the outboard side of the frame, and another applique connected to and covering the inboard side of the frame,
wherein the at least two appliques are connected together to form a seal therebetween that inhibits environmental factors from reaching the cast frame,
wherein the cast frame includes an opening, and one of the at least two appliques includes an exterior wall and an interior wall offset from the exterior wall with a cavity located between the exterior wall and the interior wall,
wherein the one of the at least two appliques includes a fastener connecting the one applique to the proximal end of the cast frame by being inserted through a hole in the interior wall and into the opening.

7. The autonomous vehicle according to claim 6, wherein the fastener clips into the opening.

8. The autonomous vehicle according to claim 6, wherein:
the at least two appliques contact the cast frame;
the at least two appliques are each an injection molded part; and
the at least two appliques separate a covered part of the cast frame from the environment.

9. The autonomous vehicle according to claim 6, wherein the cast frame is a high pressure die casting.

10. The autonomous vehicle according to claim 6, wherein the autonomous vehicle is an autonomous motor vehicle.

* * * * *